US011649039B1

(12) United States Patent
Ankney et al.

(10) Patent No.: US 11,649,039 B1
(45) Date of Patent: May 16, 2023

(54) AEROSTRUCTURE ACTUATION SYSTEM

(71) Applicant: Hamilton Sundstrand Corporation, Charlotte, NC (US)

(72) Inventors: Darrell E. Ankney, Dixon, IL (US); Jerold L. Blackmer, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/584,521

(22) Filed: Jan. 26, 2022

(51) Int. Cl.
*B64C 13/28* (2006.01)
*B64C 9/20* (2006.01)

(52) U.S. Cl.
CPC ............ *B64C 13/28* (2013.01); *B64C 9/20* (2013.01)

(58) Field of Classification Search
CPC ........... B64C 9/20; B64C 13/24; B64C 13/26; B64C 13/28; B64C 13/343
See application file for complete search history.

(56) References Cited

U.S. PATENT DOCUMENTS

| 2,547,137 | A | * | 4/1951 | Ochtman | F16D 7/025 192/18 B |
|---|---|---|---|---|---|
| 7,677,376 | B2 | | 3/2010 | Schachtl et al. | |
| 8,015,890 | B2 | | 9/2011 | Christensen et al. | |
| 8,267,350 | B2 | | 9/2012 | Elliott et al. | |
| 8,960,031 | B2 | | 2/2015 | Keech et al. | |
| 9,434,469 | B2 | * | 9/2016 | Zantz | B64C 13/34 |
| 9,523,416 | B2 | | 12/2016 | Hudson et al. | |
| 9,580,189 | B2 | | 2/2017 | Brady et al. | |
| 9,703,312 | B2 | | 7/2017 | Larson | |
| 9,868,511 | B2 | | 1/2018 | Henning et al. | |
| 10,538,310 | B2 | | 1/2020 | Polcuch | |
| 11,174,006 | B2 | | 11/2021 | Tzabari | |
| 2020/0019992 | A1 | | 1/2020 | Hardham et al. | |
| 2021/0254674 | A1 | | 8/2021 | Seminel | |

* cited by examiner

*Primary Examiner* — Richard G Davis
(74) *Attorney, Agent, or Firm* — CantorColburn LLP

(57) ABSTRACT

Aerostructure actuator systems include first and second shaft portions having respective first and second mandrels and a clutch assembly arranged within the first mandrel and connecting the shaft portions. The clutch assembly includes a post with a post extension fixedly connected to the second mandrel. A first bearing is installed on the post extension to frictionally engage with a portion of the post. A second bearing is installed on the post. A spacer is arranged between the bearings and is fixedly attach to the first mandrel. A load setting nut is configured to engage with the post extension and apply a compressive force to the bearings and spacer against the post. The compressive force defines a coupling limit between the shaft portions. The clutch assembly is configured to rotationally decouple the shaft portions from each other if a relative rotational speed between the shaft portions exceeds the coupling limit.

20 Claims, 5 Drawing Sheets

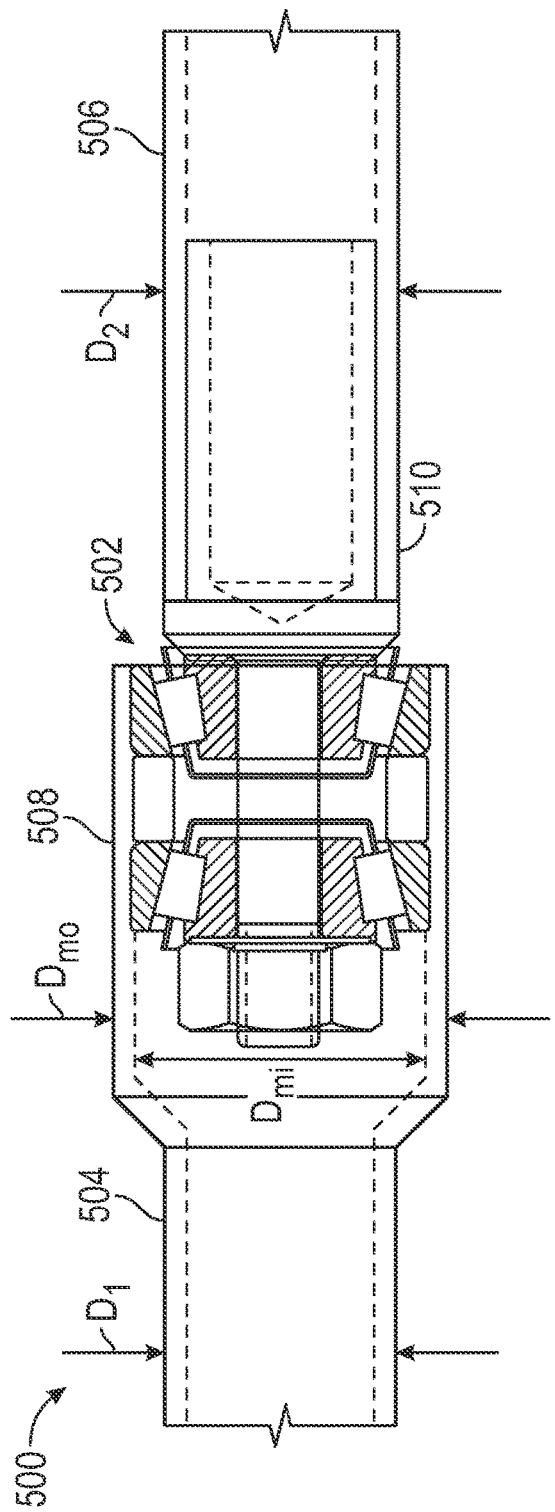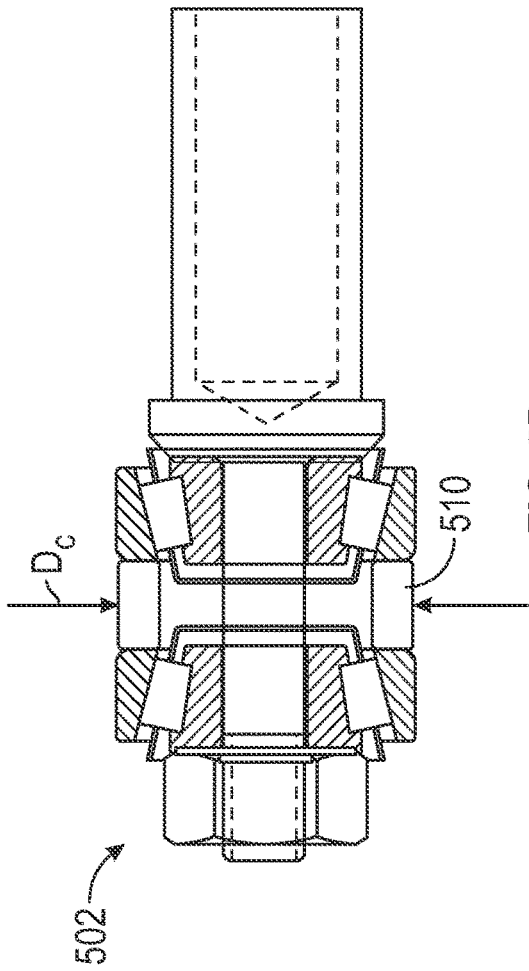
FIG. 5A
FIG. 5B

AEROSTRUCTURE ACTUATION SYSTEM

BACKGROUND

Embodiments of the present disclosure are directed to actuator systems and, more specifically, to actuator systems for rotating one or more structures, such as aerostructures (e.g., flaps, slats, alerions, etc.) and other actuatable structures.

Wing sections of fixed wing aircraft may include geared rotary actuator(s) at a hinge line between an aft section of a wing and the aerostructure (e.g., flaps, slats, etc.). Conventionally, aerostructures are controlled using an actuator within the wing that is operably connected to such aerostructure(s). Aerostructures may be prone to damage if a load exceeds an aircraft limit load. For example, during high load events, a drive shaft or the like associated with the actuator system may cause damage to the aerostructure by applying to great of a torque.

BRIEF DESCRIPTION

According to some embodiments, aerostructure actuator systems are provided. The aerostructure actuator systems include a first shaft portion having a first mandrel, a second shaft portion having a second mandrel, and a clutch assembly arranged within the first mandrel and configured to operably connect the first shaft portion to the second shaft portion. The clutch assembly includes a post fixedly connected to the second mandrel, the post having a post extension extending therefrom, a first bearing installed on the post extension, a portion of the first bearing frictionally engaging with a portion of the post, a second bearing installed on the post, a spacer arranged between the first bearing and the second bearing, wherein the spacer is configured to fixedly attach to the first mandrel, and a load setting nut configured to threadedly engage with the post extension and apply a compressive force to the first bearing, spacer, and the second bearing against the post, wherein the compressive force defines a coupling limit between the first shaft portion and the second shaft portion. The clutch assembly is configured to rotationally decouple the first shaft portion from the second shaft portion if a relative rotational speed between the first shaft portion and the second shaft portion exceeds the coupling limit.

In addition to one or more of the features described herein, or as an alternative, further embodiments of the aerostructure actuator systems may include that the first shaft portion and the second shaft portion form a part of a drive shaft of the aerostructure actuator system.

In addition to one or more of the features described herein, or as an alternative, further embodiments of the aerostructure actuator systems may include that the drive shaft is operably coupled to a drive mechanism that is configured to rotationally drive the drive shaft.

In addition to one or more of the features described herein, or as an alternative, further embodiments of the aerostructure actuator systems may include that the drive mechanism is a motor.

In addition to one or more of the features described herein, or as an alternative, further embodiments of the aerostructure actuator systems may include an aerostructure actuator operably coupled to one of the first shaft portion and the second shaft portion.

In addition to one or more of the features described herein, or as an alternative, further embodiments of the aerostructure actuator systems may include an aerostructure operably coupled to the aerostructure actuator.

In addition to one or more of the features described herein, or as an alternative, further embodiments of the aerostructure actuator systems may include that the aerostructure is a slat or flap of an aircraft.

In addition to one or more of the features described herein, or as an alternative, further embodiments of the aerostructure actuator systems may include that each of the first bearing and the second bearing comprise an inner race, an outer race, and one or more bearing elements arranged therebetween.

In addition to one or more of the features described herein, or as an alternative, further embodiments of the aerostructure actuator systems may include that the first mandrel has an outer diameter and an inner diameter and the clutch assembly has an outer diameter that is less than the inner diameter of the first mandrel.

In addition to one or more of the features described herein, or as an alternative, further embodiments of the aerostructure actuator systems may include that the first shaft portion has as first diameter and the clutch assembly has an outer diameter that is equal to or greater than the first diameter.

In addition to one or more of the features described herein, or as an alternative, further embodiments of the aerostructure actuator systems may include that the outer diameter of the clutch assembly is between 0% and 50% larger than the first diameter.

In addition to one or more of the features described herein, or as an alternative, further embodiments of the aerostructure actuator systems may include that the second shaft portion has a second diameter that is equal to the first diameter.

In addition to one or more of the features described herein, or as an alternative, further embodiments of the aerostructure actuator systems may include that the clutch assembly further comprises a washer arranged between the load setting nut and the second bearing.

In addition to one or more of the features described herein, or as an alternative, further embodiments of the aerostructure actuator systems may include that a portion of the post fits within the second mandrel.

In addition to one or more of the features described herein, or as an alternative, further embodiments of the aerostructure actuator systems may include that the post comprises a stop and the first bearing frictionally engages with the stop.

According to some embodiments, aircraft are provided. The aircraft include an aerostructure and an aerostructure actuator system. The aerostructure actuator system includes an aerostructure actuator operably coupled to the aerostructure, a drive shaft configured to drive operation of the aerostructure actuator and comprising a first shaft portion having a first mandrel and a second shaft portion having a second mandrel, and a clutch assembly arranged within the first mandrel and configured to operably connect the first shaft portion to the second shaft portion. The clutch assembly includes a post fixedly connected to the second mandrel, the post having a post extension extending therefrom, a first bearing installed on the post extension, a portion of the first bearing frictionally engages with a portion of the post, a second bearing installed on the post, a spacer arranged between the first bearing and the second bearing, wherein the spacer is configured to fixedly attach to the first mandrel, and a load setting nut configured to threadedly engage with the post extension and apply a compressive force to the first bearing, spacer, and the second bearing against the post, wherein the compressive force defines a coupling limit between the first shaft portion and the second shaft portion. The clutch assembly is configured to rotationally decouple the first shaft portion from the second shaft portion if a relative rotational speed between the first shaft portion and the second shaft portion exceeds the coupling limit.

In addition to one or more of the features described herein, or as an alternative, further embodiments of the aircraft may include that the aerostructure is a flap or slat.

In addition to one or more of the features described herein, or as an alternative, further embodiments of the aircraft may include that the drive shaft comprises a plurality of clutch assemblies distributed along a length of the drive shaft.

In addition to one or more of the features described herein, or as an alternative, further embodiments of the aircraft may include a drive mechanism operably coupled to the drive shaft.

In addition to one or more of the features described herein, or as an alternative, further embodiments of the aircraft may include that the wherein the first shaft portion has as first diameter and the clutch assembly has an outer diameter that is between 0% and 50% larger than the first diameter.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 5A is a schematic illustration of a portion of a drive shaft having a clutch assembly in accordance with an embodiment of the present disclosure; and FIG. 5B is a schematic illustration of the clutch assembly of FIG. 5A.

DETAILED DESCRIPTION

A detailed description of one or more embodiments of the disclosed apparatus and method are presented herein by way of exemplification and not limitation with reference to the Figures.

Figure 1:
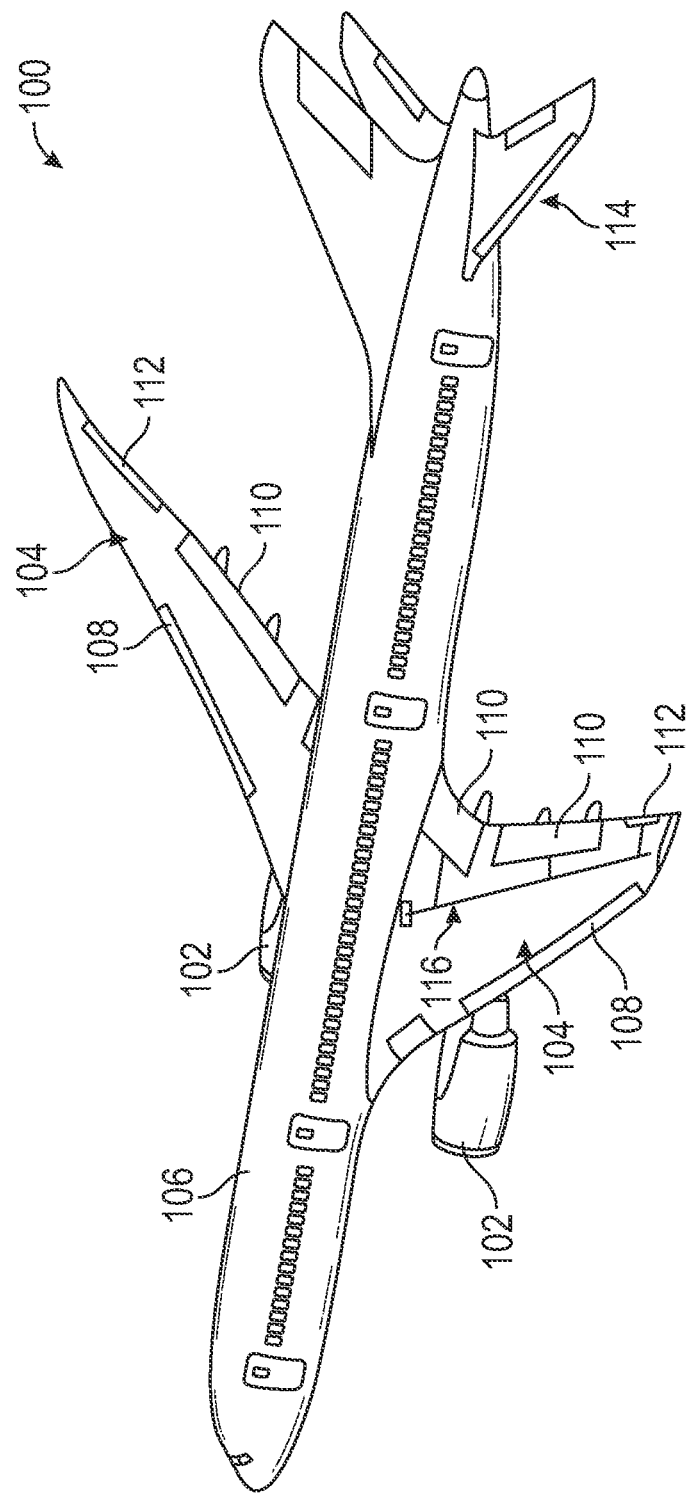
FIG. 1 is a schematic illustration of an aircraft that can include aerostructures and associated aerostructure actuator systems in accordance with embodiments of the present disclosure.

FIG. 1 illustrates an example of an aircraft 100 having aircraft engines surrounded by (or otherwise carried in) nacelles 102. The aircraft 100 includes wings 104 that extend from an aircraft fuselage 106. Each wing 104 may include one or more slats 108 on a forward edge or leading edge and one or more flaps 110 on an aft, rear, or trailing edge thereof. The wings 104 may also include ailerons 112 on the trailing edges, as will be appreciated by those of skill in the art. The aircraft 100, as shown, includes a tail structure 114 which can include various flaps, ailerons, slats, and the like, as will be appreciated by those of skill in the art. The flaps, slats, ailerons, and the like are generally referred to herein as "aerostructures" as they are movable under aircraft power systems and are configured to control flight and motion of the aircraft 100. An aerostructure actuator system 116 may be connected to one or more of the aerostructures. For example, each wing 104 and the tail structure 114 may include one or more aerostructure actuator systems 116. The aerostructure actuator systems 116 may be operably connected to the various aerostructures and configured control the operation/position of the aerostructures to control flight of the aircraft 100.

Aircraft and associated components and systems may be limited by load applications, such that aircraft load limits are imposed to prevent damage to the aircraft, components of the aircraft, or negatively impact slight of the aircraft. For example, secondary flight control systems may self-damage the aerostructure if a load exceeds an aircraft limit load. In view of this potential self-imposed damage, embodiments of the present disclosure are directed to systems for preventing over torque and other excess loads that could damage aerostructures. To achieve this, a driveline of the actuator system is provided with an integrated driveline slip-clutch that is configured to protect key aerostructures by slipping a load prior to reaching a limit load of the aircraft.

Figure 2:
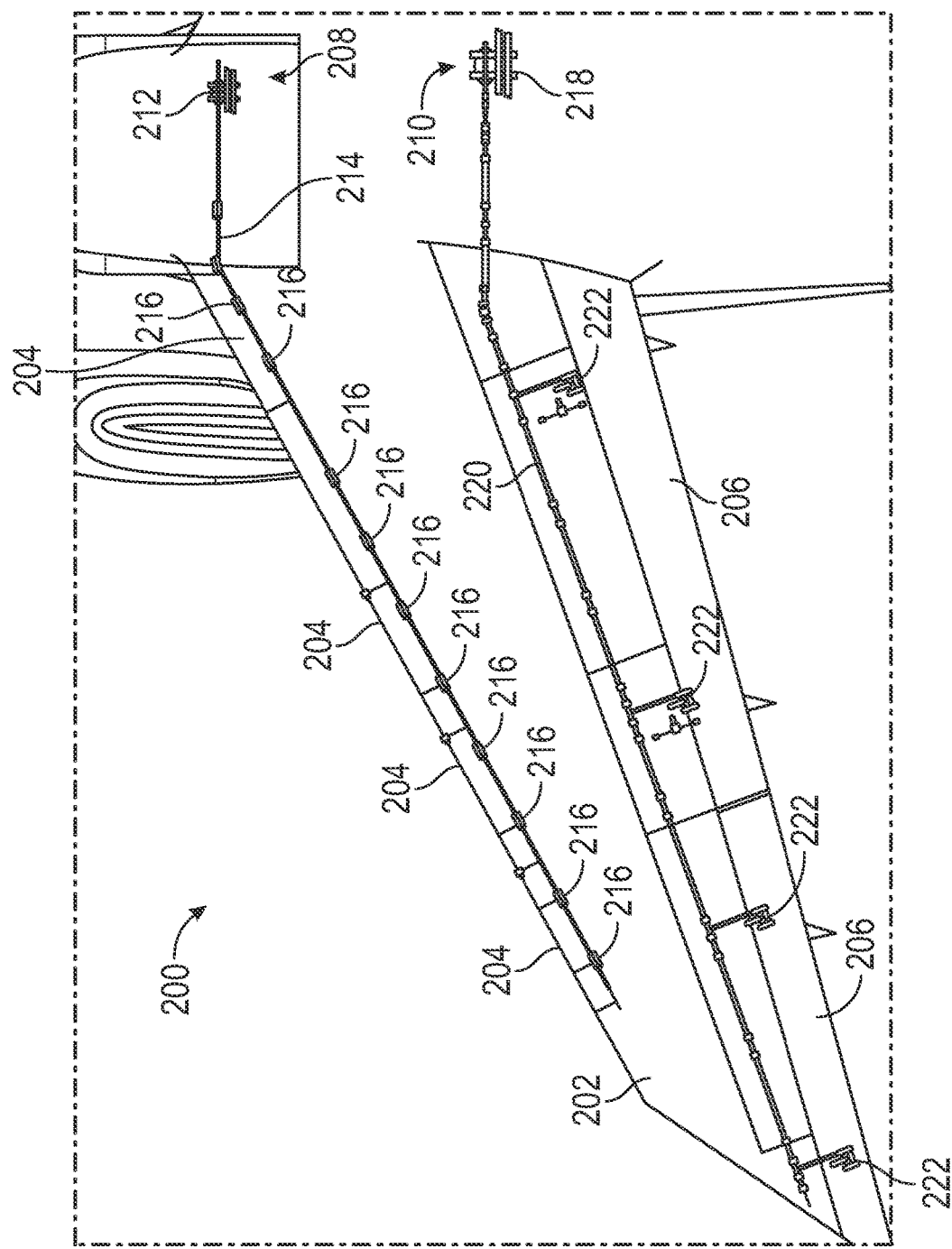
FIG. 2 is a schematic illustration of a wing of an aircraft that can include aerostructure actuator systems in accordance with embodiments of the present disclosure.

Referring now to FIG. 2, a schematic illustration of a portion of an aircraft 200 that may incorporate embodiments of the present disclosure is shown. The aircraft 200 includes a wing 202 that includes aerostructures 204, 206. Leading edge aerostructures 204 may be slats or the like and trailing edge aerostructures 206 may be flaps or the like. The leading edge aerostructures 204 may be controlled or operated by a first aerostructure actuator system 208 and the trailing edge aerostructures 206 may be controlled or operated by a second aerostructure actuator system 210.

The first aerostructure actuator system 208 includes a drive mechanism 212, such as a motor and associated components. The drive mechanism 212 is operably coupled to, and configured to drive rotation of, a drive shaft 214. The drive shaft 214 may be a segmented drive shaft that coupled to one or more aerostructure actuators 216 that may be operably driven by the drive shaft 214. Each of the leading edge aerostructures 204 may be coupled to one or more of the aerostructure actuators 216. Actuation of the aerostructure actuators 216 causes a rotational and/or translational movement of a leading edge aerostructure 204 to which the aerostructure actuator(s) 216 is connected.

The second aerostructure actuator system 210 includes a drive mechanism 218, such as a motor and associated components. The drive mechanism 218 is operably coupled to, and configured to drive rotation of, a drive shaft 220. The drive shaft 220 may be a segmented drive shaft that coupled to one or more aerostructure actuators 222 that may be operably driven by the drive shaft 220. Each of the trailing edge aerostructures 206 may be coupled to one or more of the aerostructure actuators 222. Actuation of the aerostructure actuators 222 causes a rotational and/or translational movement of a trailing edge aerostructure 206 to which the aerostructure actuator(s) 222 is connected.

The drive shafts 214, 220 may be formed from a series of torque tubes that are arranged with the aerostructure actuators 216, 222 (or portions thereof) arranged between such torque tubes. When the drive shafts 214, 220 are rotated to drive actuation of the aerostructure actuators 216, 220, at times, the rotation must be stopped. During such events, the drive shaft 214, 220 will have inertia due to the rotational spinning and cannot stop immediately, and thus may continue to rotate after a commanded stop. Such stop may be initiated by a pilot or other aircraft operator commanding a flight operation. In other situations, the stop may be initiated by the aerostructure actuator systems 208, 210 itself. In such configurations, the aerostructure actuator systems 208, 210 may include sensors that are configured to monitor operation and loads of the aerostructures 204, 206 (e.g., skew sensors, disconnect sensors, torque sensors, etc.). In accordance with embodiments of the present disclosure, the drive shafts 214, 220 may be configured with one or more slip-clutches that are arranged to decouple a portion of the drive shaft 214, 220 and thus prevent high loads to be imparted to the aerostructures.

Figure 3A:
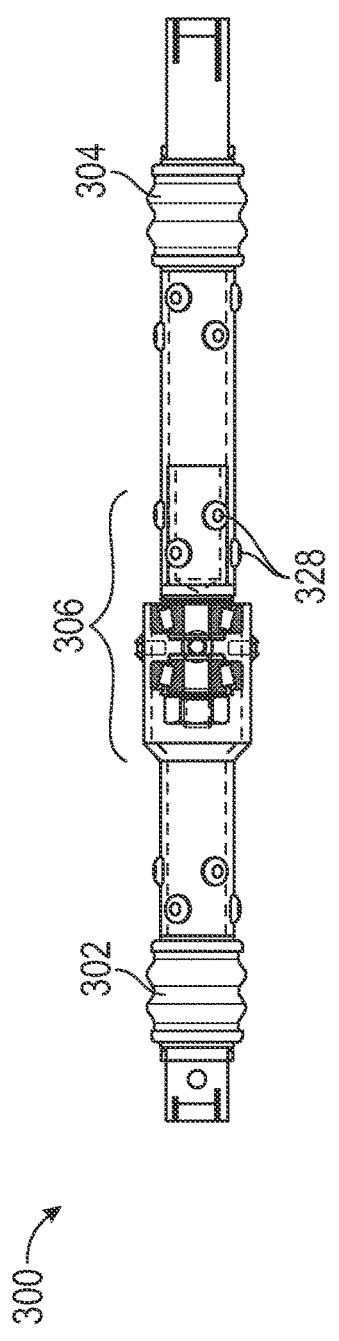
FIG. 3A is a schematic illustration of a portion of a drive shaft for an aerostructure actuator system in accordance with an embodiment of the present disclosure.
Figure 3B:
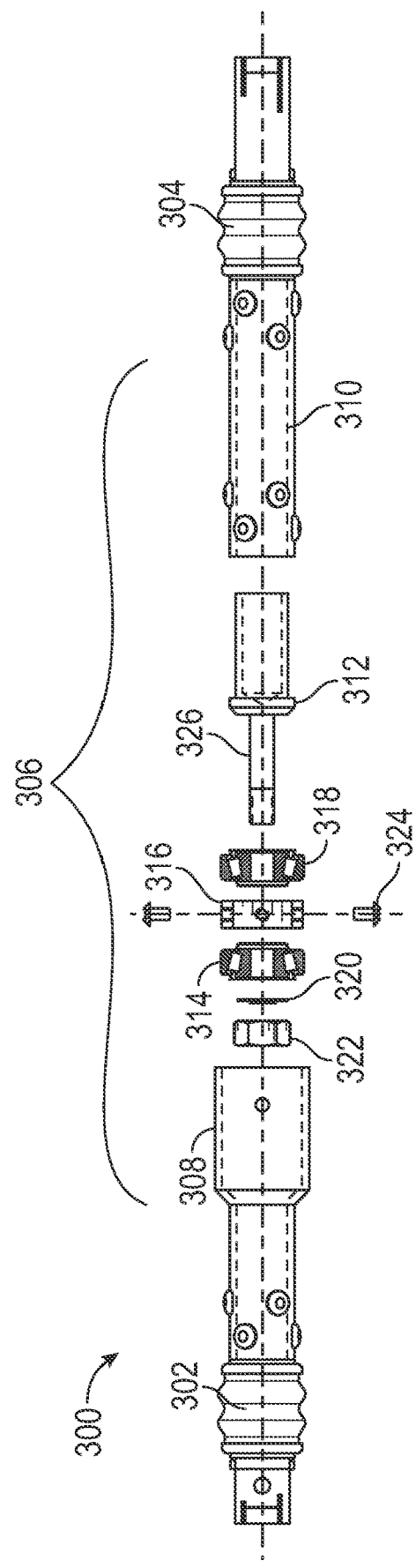
FIG. 3B is a schematic illustration of the drive shaft of FIG. 3A with the parts thereof separated.

Referring now to FIGS. 3A-3B, schematic illustrations of a portion of a drive shaft 300 for an aerostructure actuator system in accordance with an embodiment of the present disclosure are shown. The drive shaft 300 may be representative of two segments or portions of a drive shaft assembly that operably connects a drive mechanism (e.g., motor) to one or more aerostructure actuators, as will be appreciated by those of skill in the art.

The drive shaft 300 includes a first shaft portion 302 coupled to a second shaft portion 304 by a clutch assembly 306. The first and second shaft portions 302, 304 may be torque tubes or other structural elements, as will be appreciated by those of skill in the art. The clutch assembly 306 is arranged as a slip-clutch that is configured to disengage or decouple the rotation of the first shaft portion 302 from the second shaft portion 304.

The first shaft portion 302 includes a first mandrel 308 that is sized to receive, at least, parts of the clutch assembly 306 and a second mandrel 310 of the second shaft portion 304. The clutch assembly 306 includes the first mandrel 308 and the second mandrel 310. The first mandrel 308, in this specific illustrative embodiment, defines a housing for the other components of the clutch assembly 306 to fit within. The clutch assembly 306 includes a post 312, a first bearing 314, a spacer 316, a second bearing 318, a washer 320, and a load setting nut 322.

In this configuration, the first mandrel 308 is configured to fixedly connect to the spacer 316. The spacer 316 is arranged between the first bearing 314 and the second bearing 318. The spacer 316 is secured or fixedly connected to the first mandrel by one or more fasteners 324. The spacer 316, when assembled within the clutch assembly 306, is positioned to engage or connect with bearing outer races of the first and second bearings 314, 318. The post 312 includes a post extension 326 about which the bearings 314, 318, the spacer 316, the washer 320, and the load setting nut 322 may be installed. In this configuration, the load setting nut 322 may threadedly attach to an end of the post extension 326, and the other components (e.g., the washer 320, the bearings 314, 318, and the spacer 316 may be configured to not directly attach to the post 312 or post extension 326).

As noted, the outer race of the bearings 314, 318 are configured to engage with the spacer 316 which is fixedly attached to the first mandrel 308 of the first shaft portion 302. The inner race of the bearings 314, 318 are configured to engage with the post extension 326. The post extension 326 is an extension of the post 312, and the post 312 is configured to fixed attach to the second shaft portion 304 at the second mandrel 310. In this illustrative embodiment, the post 312 is configured to be installed within an interior of the second mandrel 310 and may be fixedly attached thereto by one or more fasteners 328, as will be appreciated by those of skill in the art and illustratively shown in FIG. 3A.

In normal operation, when the first shaft portion 302 is rotated, the first mandrel 308 will rotate and the rotation may be conveyed through the spacer 316 and other elements of the clutch assembly 306 to cause rotation of the post 312, which in turn will cause rotation of the second mandrel 310 and thus rotation of the second shaft portion 304. This transmission of rotational energy from the first shaft portion 302 to the second shaft portion 304 may be achieve because during normal operation the two bearings 314, 318 are fixedly connected through the spacer 316 (e.g., by friction forces). The amount of friction between the bearings 314, 318 and the spacer 316 is controlled by the load setting nut 322. This selective frictional contact enables load setting and resetting of the clutch assembly 306 if such a reset of the components is necessary.

The load setting nut is configured to threadedly engage with the post extension and apply a compressive force to the first bearing 314, the spacer 316, and the second bearing 318 against the post 312. This compressive force defines a coupling limit between the first shaft portion 302 and the second shaft portion 304 such that if a relative rotational speed between the first shaft portion 302 and the second shaft portion 304 exceeds a predefined limit (defined by the compressive force), the two shaft portions 302, 304 will rotationally decouple and prevent transmission of torque from one shaft portion to the other and thus limit the amount of load carried by the shaft portions.

Figure 4:
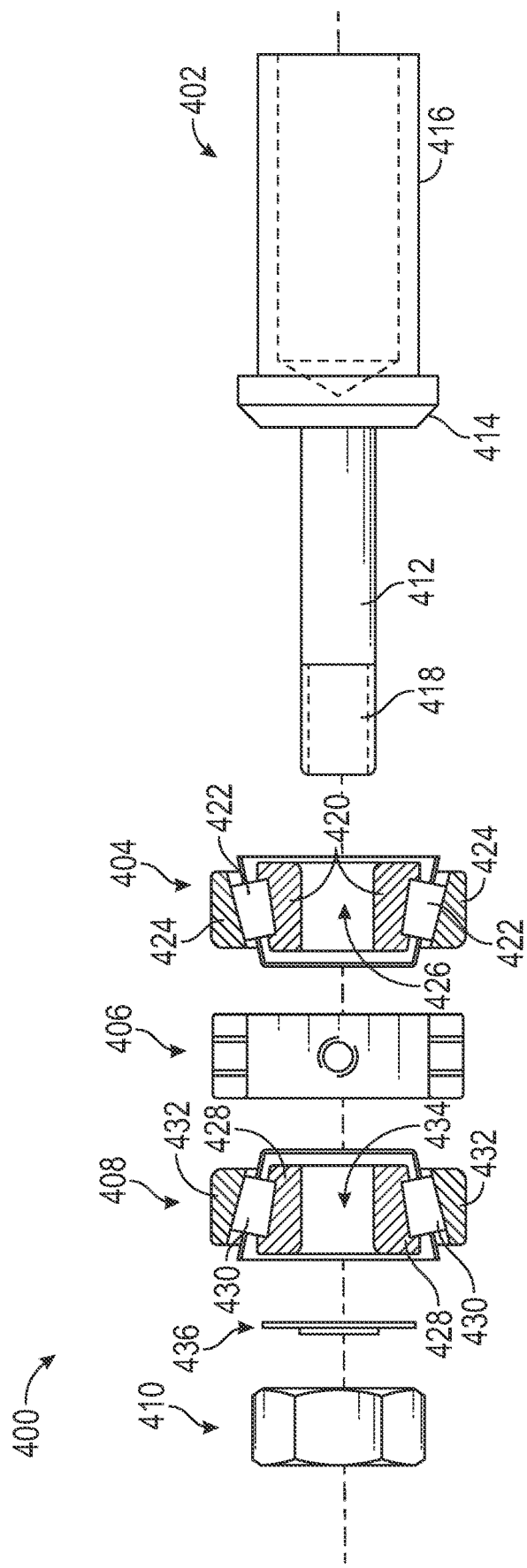
FIG. 4 is a schematic illustration of a clutch assembly in accordance with an embodiment of the present disclosure.

Turning now to FIG. 4, a schematic illustration of a clutch assembly 400 in accordance with an embodiment of the present disclosure is shown. The clutch assembly 400 may be integrated into an aerostructure actuator system for use onboard an aircraft and for controlling aerostructures of the aircraft. More particularly, as described above, the clutch assembly 400 may be part of a drive shaft of such aerostructure actuator system and may be arranged and provided to prevent over-torque or over-load events that can damage the drive shaft or other parts of the aerostructure actuator system.

Similar to the embodiment of FIGS. 3A-3B, the clutch assembly 400 is a slip-clutch configuration that is adjustable to slip given a specific amount of force applied thereto. The clutch assembly 400 a post 402, a first bearing 404, a spacer 406, a second bearing 408, a washer 410, and a load setting nut 412. The post 402 comprises a post extension 412, a stop 414, and a shaft connector 416. The shaft connector 416 is configured to fixedly connect to a shaft or tube of a drive shaft. The stop 414 provides an end surface upon which components (e.g., the first bearing) can contact and engage with to impart rotational movement (e.g., through frictional contact). The post extension 412 includes a threaded portion 418 that is configured to receive and threadedly connect with the load setting nut 410. In some configurations, the post extension 412 may not include threading between the threaded portion 418 and the stop 414. This non-threaded portion allows for components to rotate freely about the post extension 412.

The load setting nut 412 is configured to threadedly engage and connect to the post extension 412 at the threaded portion 418 thereof. Between the load setting nut 412 and the stop 414 of the post 402 are positioned the first bearing 404, the spacer 406, the second bearing 408, and the washer 410. The first bearing 404 includes an inner race 420, one or more bearing elements 422, and an outer race 424. The inner race 420, the bearing elements 422, and the outer race 424 form a concentric or annular arrangement about a central aperture 426 through which the post extension 412 may pass. The inner race 420 of the first bearing 404 is configured to frictionally engage with the stop 414. The outer race 424 of the first bearing 404 is configured to frictionally engage with the spacer 406. The bearing elements 422 are configured to be stationary relative to both the inner race 420 and the outer race 424 during normal operation. The inner and outer races 420, 424 have angled or wedged surfaces such that a compression of the two races 420, 424 determines the frictional engagement of the bearing elements 422 therebetween. If a predetermined torque is applied to one or both of the races 420, 424, the frictional engagement with the bearing elements 422 may be overcome, thus permitting relative rotation of the races 420, 424 and the components operably connected thereto. That is, the engagement between the inner and outer races 420, 424 may be decoupled upon a predetermined torque applied thereto.

The spacer 406 is configured to be fixedly secured to a mandrel of a drive shaft, and thus is configured to be in locked communication with such structure. Such attachment may be by fastener, adhesives, welding, and the like, as will be appreciated by those of skill in the art. On the opposite side of the spacer 406 from the first bearing 404 is the second bearing 408. The second bearing 408 is similarly arranged and constructed as the first bearing 404. The second bearing 408 includes an inner race 428, one or more bearing elements 430, and an outer race 432. The second bearing 408 is a circumferential or annular structure with a central aperture 434 provided therein for installation of the second bearing 408 on the post extension 412 of the post 402. Similar to the first bearing 404, the outer race 432 of the second bearing 408 is configured to frictionally engage with the spacer 406. The inner race 428 of the second bearing 408 is configured to frictionally engage with the load setting nut 410 or a washer 434 that may be provided between the load setting nut 410 and the inner race 428 of the second bearing 408.

The load setting nut 410 may be tightened on the threaded portion 418 of the post extension 412 to compress the washer 436, the first and second bearings 404, 408, and the spacer 406 between the load setting nut 410 and the stop 414 of the post 402. This compression applied by the load setting nut 410 enables tailoring of the torque or other forces that can overcome the frictional engagement of the components of the clutch assembly 400 and thus allow for relative rotational movement between the various components. That is, the setting of the compression using the load setting nut 410 enables setting of a load limit that if exceeded the components of the clutch assembly 400 will decouple such that excessive inertia is not transferred from one side (e.g., from the first shaft portion 302 to the second shaft portion 304 shown in FIGS. 3A-3B). This decoupling ensures that excessive loads and forces are not conveyed through the drive shaft, and thus damage to components thereof may be reduced or eliminated.

As illustratively shown and described herein, the majority of the clutch assembly components in accordance with embodiments of the present disclosure are housed within a portion of the drive shaft. This small profile or package for the clutch assembly provides advantages over prior configuration which may be relatively large. In such prior configurations, a drive shaft portion would be attached to the clutch on either side and the clutch would sit between such shaft portions. Because of the size and weight of the clutch in such configurations, a high or large inertia would be present during a transition from a rotational state to a change to no rotation or a change in direction (e.g., reverse of the rotation) during flight maneuvers. This high inertia results in continued rotation after a commanded change, and such continued rotation may cause damage to components that are commanded to operate differently from a prior state of operation. Advantageously, the clutch assemblies of the present disclosure have low inertia due to a low/small profile, which reduces risk of damage to components of the clutch assembly, drive shaft, aerostructure actuator system, aerostructures, and/or associated components.

The low profile or small packaging of a clutch assembly in accordance with an embodiment of the present disclosure is shown in FIGS. 5A-5B. FIG. 5A illustrates a portion of a drive shaft 500 for an aerostructure actuator system in accordance with an embodiment of the present disclosure having a clutch assembly 502 installed within/relative to shaft portions 504, 506 of the drive shaft 500 of an aerostructure actuator system. FIG. 5B illustrates the clutch assembly 502 in isolation for explanatory and clarity purposes.

As shown in FIG. 5A, the first shaft portion 504 has a first diameter $D_1$ and the second shaft portion 506 had a second diameter $D_2$. In some configurations the first diameter $D_1$ is equal to the second diameter $D_2$. The first shaft portion 504 includes a respective first mandrel 508 and the second shaft portion 506 includes a respective second mandrel 510. In this illustrative embodiment, the second mandrel 510 of the second shaft portion 506 is substantially the same or equal in diameter as the second shaft portion 506 (i.e., the second mandrel has a diameter equal to the second diameter $D_2$ of the second shaft portion 506). The first mandrel 508 of the first shaft portion 504 has an enlarged outer diameter $D_{mo}$ as compared to the diameter (first diameter $D_1$) of the first shaft portion 504. That is, the outer diameter $D_{mo}$ of the first mandrel 508 is enlarged as compared to the first diameter $D_1$ of the first shaft portion 504. Such increased size of the first mandrel 508 allows accommodation or installation of the clutch assembly 502 within the first mandrel 508, as shown in FIG. 5A. The first mandrel 508 is a hollow body housing to receive the clutch assembly 502 therein. The first mandrel 508 has an inner diameter $D_{mi}$ that is sized to receive the clutch assembly 502 and allow connection between the first mandrel 508 and a spacer 510 of the clutch assembly 502. For example, as shown and described above, fasteners or the like may be passed through the first mandrel 508 and fasten or engage with the spacer 510 to fixedly connect the spacer to the first mandrel 508 and thus to the first shaft portion 504.

To allow for the fastening connection between the first mandrel 508 and the spacer 510 of the clutch assembly 502, the spacer 510 has an outer diameter $D_c$ that defines the largest outer diameter of the clutch assembly 502. By having the outer diameter $D_c$ of the clutch assembly 502 being smaller but substantially equal to the inner diameter $D_{mi}$ of the first mandrel 508 allows for installation of the clutch assembly 502 within the first mandrel 508 and for a fastener to fixedly connect the spacer 510 to the first mandrel 508. In some non-limiting embodiments, the outer diameter $D_c$ of the clutch assembly 502 may be about the same dimension of the first and second diameters $D_1$, $D_2$ of the shaft potions 504, 506 or only slightly larger than the first and second diameters $D_1$, $D_2$. In some non-limiting embodiments, the outer diameter $D_c$ of the clutch assembly 502 may be between 0% and 50% larger than the first and second diameters $D_1$, $D_2$ of the shaft potions 504, 506. In some non-limiting embodiments, the outer diameter $D_c$ of the clutch assembly 502 may be less than the first and second diameters $D_1$, $D_2$ of the shaft potions 504, 506. In some non-limiting embodiments, the outer diameter $D_{mo}$ of the first mandrel 508 may be between 0% and 50% larger than the first and second diameters $D_1$, $D_2$ of the shaft potions 504, 506. From this perspective, the total maximum diameter may be defined by the outer diameter $D_{mo}$ of the first mandrel 508 that is configured to house the clutch assembly 502. This is in contrast to prior clutch assembly configurations where the clutch assembly may be positioned between (not in or around) two shaft portions and may have a sizing with an equivalent diameter being at least twice that of the shaft itself. This larger size is part of why such prior clutch assemblies had high inertia and could cause damage or other issues associated with operation of aerostructure actuator systems.

It will be appreciated that one or more of the clutch assemblies described herein may be implemented within a drive shaft of an aerostructure actuator system. In some embodiments, a single clutch assembly as described herein may be arranged between a drive mechanism (e.g., motor or the like) and a drive shaft that may be operably connected to one or more aerostructure actuators. In other embodiments, multiple such clutch assemblies may be distributed along the length of a drive shaft, and thus allow for multiple different points of decoupling at the respective clutch, based on torque loads and/or the load setting of the load setting nuts of the clutch assemblies. In such multi-assembly systems, each clutch assembly may be configured with a different threshold based on location and total loads at the specific location of the clutch assembly. As such, a clutch assembly close to a drive mechanism may have a different load threshold (based on setting of the load setting nut) than a clutch assembly at the distal end of a drive shaft (e.g., proximate a tip or end of a wing).

Advantageously, embodiments of the present disclosure provide for improved aerostructure actuator systems for use on aircraft. In accordance with some embodiments, low profile, low inertia clutch systems are provided within aerostructure actuator systems to reduce potential for damage or other risks associated with high inertia situations. The total package of the clutch assembly is significantly smaller than prior clutch assemblies, thus providing improved weight and operation benefits. Secondary flight control systems may self-damage the aerostructure if a load exceeds an aircraft limit load. The integrated driveline slip-clutches described herein can protect key aerostructures by slipping the load prior to reaching the limit load of the aircraft. In accordance with some embodiments of the present disclosure, the slip-clutch assemblies are integrated into the drive line of the high lift system. The compression of the bearing within the slip-clutch to the plate or spacer determines the setting of the slip load. The slip is resettable when the load is reduced below the set slip load or when the rotation stops. Advantageously, the clutch assemblies described herein may be light weight and compact in design (e.g., fitting within a mandrel of a portion of a drive shaft), thus providing weight, volume, and operational benefits, as described herein.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:

1. An aerostructure actuator system comprising:
    a first shaft portion having a first mandrel;
    a second shaft portion having a second mandrel; and
    a clutch assembly arranged within the first mandrel and configured to operably connect the first shaft portion to the second shaft portion, wherein the clutch assembly comprising:
        a post fixedly connected to the second mandrel, the post having a post extension extending therefrom;
        a first bearing installed on the post extension, a portion of the first bearing frictionally engaging with a portion of the post;
        a second bearing installed on the post;
        a spacer arranged between the first bearing and the second bearing, wherein the spacer is configured to fixedly attach to the first mandrel; and
        a load setting nut configured to threadedly engage with the post extension and apply a compressive force to the first bearing, spacer, and the second bearing against the post, wherein the compressive force defines a coupling limit between the first shaft portion and the second shaft portion,
        wherein the clutch assembly is configured to rotationally decouple the first shaft portion from the second shaft portion if a relative rotational speed between the first shaft portion and the second shaft portion exceeds the coupling limit.

2. The system of claim 1, wherein the first shaft portion and the second shaft portion form a part of a drive shaft of the aerostructure actuator system.

3. The system of claim 2, wherein the drive shaft is operably coupled to a drive mechanism that is configured to rotationally drive the drive shaft.

4. The system of claim 3, wherein the drive mechanism is a motor.

5. The system of claim 1, further comprising an aerostructure actuator operably coupled to one of the first shaft portion and the second shaft portion.

6. The system of claim 5, further comprising an aerostructure operably coupled to the aerostructure actuator.

7. The system of claim 6, wherein the aerostructure is a slat or flap of an aircraft.

8. The system of claim 1, wherein each of the first bearing and the second bearing comprise an inner race, an outer race, and one or more bearing elements arranged therebetween.

9. The system of claim 1, wherein the first mandrel has an outer diameter and an inner diameter and the clutch assembly has an outer diameter that is less than the inner diameter of the first mandrel.

10. The system of claim 1, wherein the first shaft portion has as first diameter and the clutch assembly has an outer diameter that is equal to or greater than the first diameter.

11. The system of claim 10, wherein the outer diameter of the clutch assembly is between 0% and 50% larger than the first diameter.

12. The system of claim 10, wherein the second shaft portion has a second diameter that is equal to the first diameter.

13. The system of claim 1, wherein the clutch assembly further comprises a washer arranged between the load setting nut and the second bearing.

14. The system of claim 1, wherein a portion of the post fits within the second mandrel.

15. The system of claim 1, wherein the post comprises a stop and the first bearing frictionally engages with the stop.

16. An aircraft comprising:
an aerostructure; and
an aerostructure actuator system comprising:
  an aerostructure actuator operably coupled to the aerostructure;
  a drive shaft configured to drive operation of the aerostructure actuator and comprising a first shaft portion having a first mandrel and a second shaft portion having a second mandrel; and
  a clutch assembly arranged within the first mandrel and configured to operably connect the first shaft portion to the second shaft portion, wherein the clutch assembly comprising:
    a post fixedly connected to the second mandrel, the post having a post extension extending therefrom;
    a first bearing installed on the post extension, a portion of the first bearing frictionally engages with a portion of the post;
    a second bearing installed on the post;
    a spacer arranged between the first bearing and the second bearing, wherein the spacer is configured to fixedly attach to the first mandrel; and
    a load setting nut configured to threadedly engage with the post extension and apply a compressive force to the first bearing, spacer, and the second bearing against the post, wherein the compressive force defines a coupling limit between the first shaft portion and the second shaft portion,
  wherein the clutch assembly is configured to rotationally decouple the first shaft portion from the second shaft portion if a relative rotational speed between the first shaft portion and the second shaft portion exceeds the coupling limit.

17. The aircraft of claim 16, wherein the aerostructure is a flap or slat.

18. The aircraft of claim 16, wherein the drive shaft comprises a plurality of clutch assemblies distributed along a length of the drive shaft.

19. The aircraft of claim 16, further comprising a drive mechanism operably coupled to the drive shaft.

20. The aircraft of claim 16, wherein the wherein the first shaft portion has as first diameter and the clutch assembly has an outer diameter that is between 0% and 50% larger than the first diameter.

* * * * *